Figure 2:
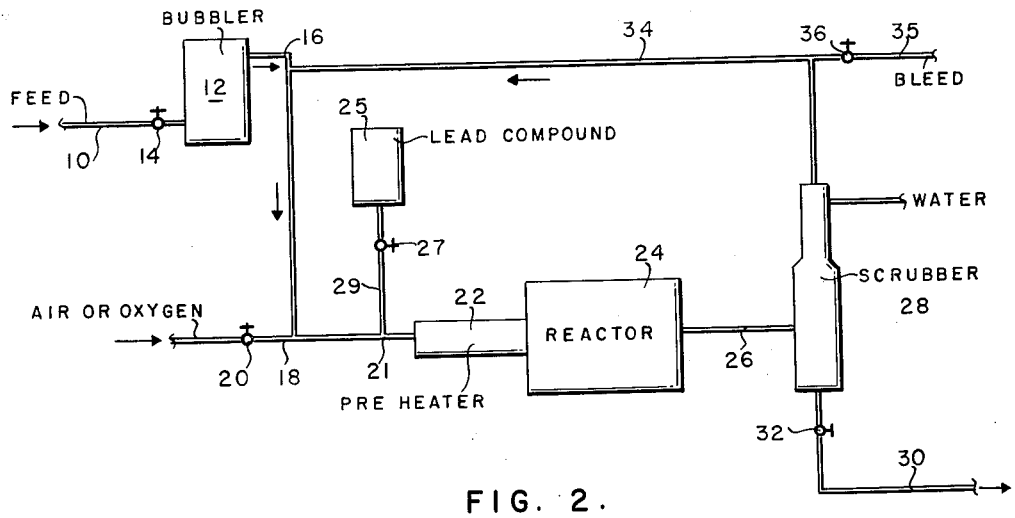

May 1, 1962  E. M. MAGEE  3,032,588
OXIDATION OF GASEOUS HYDROCARBONS TO FORMALDEHYDE
Filed April 30, 1959

INVENTOR.
ELLINGTON M. MAGEE
BY Frank S. Troidl
ATTORNEY.

United States Patent Office 3,032,588
Patented May 1, 1962

3,032,588
OXIDATION OF GASEOUS HYDROCARBONS TO FORMALDEHYDE
Ellington M. Magee, North Plainfield, N.J., assignor, by mesne assignments, to Esso Research and Engineering Company, Elizabeth, N.J., a corporation of Delaware
Filed Apr. 30, 1959, Ser. No. 809,945
1 Claim. (Cl. 260—604)

This invention relates to the partial oxidation of gaseous hydrocarbons, such as the aliphatic hydrocarbons, to aldehydes, such as formaldehyde. More particularly, this invention relates to the production of commercially usable quantities of formaldehyde from gaseous hydrocarbons.

This invention is a continuation-in-part of patent application Serial No. 752,318, filed July 31, 1958, entitled, "Oxidation of Gaseous Hydrocarbons to Formaldehyde," and now abandoned.

The most common gaseous hydrocarbon is methane. Hence, if commercially usable quantities of formaldehyde can be produced from a feed containing methane, such formaldehyde could be very cheaply supplied. However, methane is very unreactive in nature. At the temperatures required for active reaction between methane and oxygen, the desired formaldehyde product is thermodynamically unstable at atmospheric pressure.

A further difficulty encountered in the attempted oxidation of methane is the fact that the formaldehyde dissociates into by-products, such as carbon monoxide and carbon dioxide. Hence, the yields of formaldehyde from the partial oxidation of methane in general are very low.

The invention to be described herein is a new and useful system and process for producing a commercially economical yield of formaldehyde from a feed stock of gaseous hydrocarbons, which if desired can consist entirely of methane. The yield of formaldehyde obtained from using this process is sufficiently high, and the selectivity is sufficiently great to warrant the use of this process commercially in view of the low cost involved.

The process and apparatus to be described herein can be used, if desirable, with a gaseous feed consisting entirely of methane. However, it is to be understood that the process and apparatus has equal applicability when used with a feed stock of gaseous hydrocarbons which consist of mixtures of methane and higher normally gaseous hydrocarbons, such as ethane, propane, butane, ethylene, and propylene.

Briefly described, the gas mixture, including at least the gaseous hydrocarbon and an oxygen containing gas, is first preheated. The preheated mixture of gases is then oxidized in an oxidation reaction zone. The reaction zone may consist of a metal reactor, such as a stainless steel reactor. The inner surfaces of the metal reactor are coated with a lead oxide coating. Hence, during the partial oxidation reaction, the gases are in contact with surfaces in the reactor which are coated with lead oxide. By using a stainless steel reactor coated with lead oxide, a ten-fold higher selectivity to formaldehyde is obtained than when using the uncoated reactor. A higher yield based on methane concentration can also be obtained.

Figure 1:
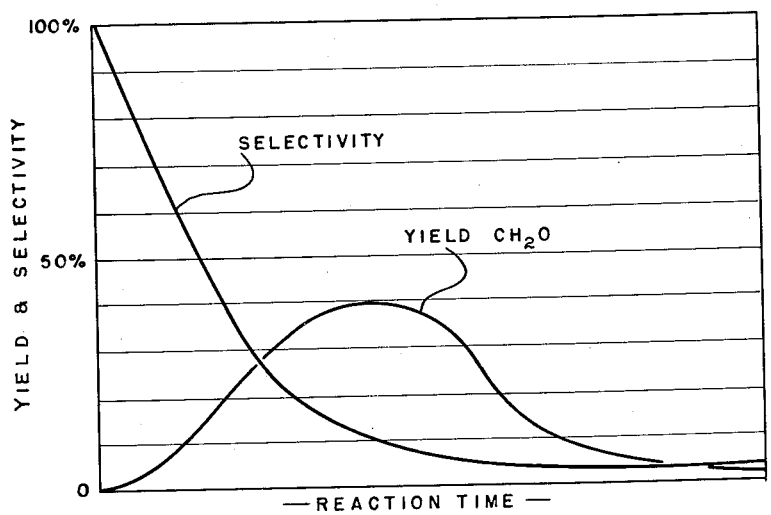

The invention as well as its many advantages will be further understood by reference to the following detailed description and drawings, in which:

FIG. 1 is a graph useful in explaining the manner in which the process is carried out; and FIG. 2 is a schematic flow diagram showing one system for carrying out the partial oxidation of methane to formaldehyde and including as a part of the system the process and apparatus of this invention.

The graph shown in FIG. 1 represents typical curves of selectivity and yield of $CH_2O$ with respect to the time of reaction. In the oxidation of methane to formaldehyde, the selectivity curve varies from 100% formaldehyde at very short reaction times to close to 0 at longer reaction times, as indicated in FIG. 1. The yield of formaldehyde increases with the reaction time to a maximum and then decreases as more and more formaldehyde decomposes into the unwanted carbon monoxide and carbon dioxide by-products. The selectivity is defined as:

$$\frac{\text{Moles } CH_2O}{\text{Moles } CH_2O + \text{moles } CO + \text{moles } CO_2} \times 100$$

The yield is based on methane and is equal to:

$$\text{Yield (percent)} = \frac{\text{moles } CH_2O}{\text{moles feed } CH_4} \times 100$$

Both the yield and the selectivity are important in any process. If the selectivity is fairly high at the point of greatest yield a smaller portion of the essential $CH_4$ feed put into the process is converted to carbon monoxide and carbon dioxide than if the selectivity is low. This means that a greater portion of the methane is left unreacted and can be recycled so that the ultimate product is greater with a higher selectivity even though the yield per pass may be the same. Hence, since the selectivity of formaldehyde using the lead oxide coated reactor is many times higher than the selectivity using an uncoated reactor, the advantage of the process and apparatus described herein is obvious.

A reactor was rinsed with a 10% solution of lead nitrate, in water, drained, and dried. The reactor was then slowly heated to reaction temperature to decompose the lead nitrate, which decomposes at 878° F. to give PbO. Four parts of methane to one of oxygen were mixed and allowed to flow through the stainless steel reactor having the PbO coating. The exit gas was water scrubbed to remove the formaldehyde. The formaldehyde concentration was then determined. The result of these tests are set out in Table I.

TABLE I

*Effect of Lead Oxide Coating on Methane Oxidation*

| Run No. | Temp., °F. | Time, Sec. | Yield, Mole Percent | | | $CH_2O$ Selectivity, Percent | Remarks |
|---|---|---|---|---|---|---|---|
| | | | $CH_2O$ | $CO_2$ | $CO$ | | |
| B-48 | 1,400 | 0.5 | 0.04 | 0.61 | 0 | 6.2 | Reactor rinsed with 10% solution of $PbNO_3$. |
| 49 | 1,510 | 0.5 | 0.09 | 0.49 | 0 | 15.2 | |
| 50 | 1,510 | 1.0 | 0.07 | 1.3 | 0 | 5.5 | |
| 51 | 1,555 | 1.0 | 0.07 | 3.1 | 2.1 | 1.4 | |
| 52 | 1,555 | 0.5 | 0.18 | 3.3 | 1.6 | 3.4 | |
| 53 | 1,510 | 0.3 | 0.19 | 3.0 | 0.84 | 4.6 | |
| B-43 | 1,428 | 0.5 | 0.06 | 7.0 | 1.6 | 0.68 | New uncoated reactor. |

The large increase in selectivity can be seen by comparing the results from the lead oxide coated reactor with run B-43, in which no lead had been used. The effects on selectivity are less in later runs due to the removal of lead oxide with the passage of time at the high temperatures of the reaction. However, a volatilizable lead compound which is converted to lead oxide under the conditions in the reaction zone can be added either continuously or intermittently in order to replenish the lead oxide coating on the reactor walls.

The volatile lead compound, such as the lead alkyls, are added to the gas stream in a continuous flow oxidation process or, alternatively, bursts of the lead compound may be fed into the gas stream at intervals in sufficient quantity to maintain a suitable coating of lead oxide on the walls of the reactor. The quantity of the lead alkyls may range from 0.0005% to 0.002% by volume of total gas flow, the actual amount depending upon the temperature. At higher temperatures, say above 1400° F., the PbO is gradually removed by the gas stream. At lower temperatures, no lead need be added, or added only occasionally.

Any lead compound which is volatile enough and which can be oxidized by oxygen or air or decomposed to lead oxide under the conditions used in the reaction may be applied in this way. Examples of such lead compounds are tetraethyl lead, tetramethyl lead, and higher lead alkyls.

Methane and oxygen were mixed in a 4:1 ratio and then mixed with nitrogen so that the 50% nitrogen was present in the mixture. The mixture was preheated and run through a stainless steel reactor. The exit gases were scrubbed with cold $H_2O$, and a sample of the effluent was taken. The formaldehyde content of the scrubbed water was determined. The results are shown in the first line of Table II.

This test was repeated, except that the methane was bubbled through lead tetraethyl held at 32° F. The results are shown in the second line of Table II.

The test was repeated a third time, using the same reactor in which lead tetraethyl had been used, except that in this test, no lead tetraethyl was used. The results are shown in the third line of Table II.

TABLE II

*Oxidation of Methane*

| Run No. | Temp., °F. | $CH_2O$ Yield, Mole percent | $CH_2O$ Selectivity, Mole percent | Results |
|---|---|---|---|---|
| B-43 | 1,428 | 0.220 | 0.356 | New reactor-no lead tetraethyl. |
| G-1 | 1,410 | 0.483 | 3.70 | Lead tetraethyl in gas stream. |
| B-44 | 1,427 | 0.473 | 6.63 | No TEL-Using reactor through which TEL had been passed in G-1. |

As can be seen from the table, the yield is doubled when TEL is passed through the reactor; and the selectivity is increased by a factor of 10. After the TEL has been used, the yield remains high; and the selectivity also remains high.

FIG. 2 is a schematic flow diagram illustrating a complete system for obtaining formaldehyde from normally gaseous hydrocarbons. This system includes as a portion thereof the process and apparatus of my invention.

Referring to FIG. 2, a feed, which may consist entirely of methane, is conducted through pipe 10 to a bubbler 12. The flow of feed is controlled by means of a valve 14 in pipe conduit 10. The bubbler 12 may contain nitric acid, which is added to the gas stream. The nitric acid ranges from a mixture of 50% concentrated nitric acid and 50% water to 100% concentrated nitric acid. The concentrated acid used may be C.P. grade acid consisting of 70.4% $HNO_3$ in water.

The feed is thus bubbled upwardly through the nitric acid in bubbler 12. The resulting gases are conducted through gas conduit 16.

A free-oxygen containing gas, such as air or oxygen, is conducted through gas conduit 18 under control of valve 20 and mixed with the gases flowing through gas conduit 16. The flow of gases through gas conduits 16 and 18 are controlled to provide the proper ratio of methane with respect to the oxygen. It has been found that methane to oxygen ratios ranging from 2 to 20 are suitable. If the methane to oxygen ratio is below 2, the system may start to burn.

The mixture of gases flowing through gas conduit 16 and air or oxygen flowing through gas conduit 18 is conducted through conduit 21 to a preheater 22. In the preheater 22, the mixture is preheated to the desired reaction temperature. The mixture is then caused to react in reactor 24 and the hydrocarbons oxidized into gaseous products, including the desired formaldehyde.

The reactor 24 has its reactor walls coated with lead oxide in a manner described above. A vessel 25 contains the lead compound which may be continuously added to the gas feed in order to replenish the lead oxide coating of the reactor. If desired, the lead compound may be added intermittently. For this purpose, a valve 27 is provided in a lead compound feed line 29.

The gases from the reactor 24 are conducted through gas conduit 26 to a water scrubbing system illustrated by scrubber 28. The desired intermediate products, including formaldehyde, are thus passed into solution with the water. The product may be removed from the scrubber 28 through liquid conduit 30 under control of valve 32. The unused methane may be recycled through conduit 16 by means of gas conduit 34. A bleed line 35 controlled by valve 36 is provided for removal of some of the product gases making room for fresh feed.

The bubbler is at room temperature. All pressures can be atmospheric.

I claim:

In a process for producing formaldehyde by the partial oxidation of normally gaseous hydrocarbons in which a preheated gas mixture containing said hydrocarbons is oxidized and formaldehyde produced: the steps of reacting said gases after preheating and during oxidation, in a reaction zone in contact with surfaces coated with lead oxide; and after the reacting of said gases has been started, adding a volatilizable lead compound which is converted to lead oxide under the conditions in the reaction zone the quantity of said volatilitizable lead compound ranging from 0.0005% to 0.002% by volume of the total gas flow.

References Cited in the file of this patent

UNITED STATES PATENTS

| 1,776,771 | Boomer | Sept. 30, 1930 |
| 2,270,779 | Berl | Jan. 20, 1942 |
| 2,365,851 | Thomas | Dec. 26, 1944 |

FOREIGN PATENTS

| 716,181 | Great Britain | Sept. 29, 1954 |